(12) United States Patent
Zhang et al.

(10) Patent No.: US 9,015,718 B1
(45) Date of Patent: Apr. 21, 2015

(54) IDENTIFYING TASK INSTANCES THAT INTERFERE WITH PROCESSOR PERFORMANCE

(75) Inventors: Xiao Zhang, Mountain View, CA (US); Eric S. Tune, Saratoga, CA (US); Rohit Jnagal, Sunnyvale, CA (US); Robert Hagmann, Palo Alto, CA (US); Vrijendra Gokhale, Cupertino, CA (US)

(73) Assignee: Google Inc., Mountain View, CA (US)

( * ) Notice: Subject to any disclaimer, the term of this patent is extended or adjusted under 35 U.S.C. 154(b) by 813 days.

(21) Appl. No.: 13/247,948

(22) Filed: Sep. 28, 2011

(51) Int. Cl.
*G06F 9/48* (2006.01)
(52) U.S. Cl.
CPC .............. *G06F 9/4881* (2013.01); *G06F 9/485* (2013.01)
(58) Field of Classification Search
None
See application file for complete search history.

(56) References Cited

U.S. PATENT DOCUMENTS

| | | | | |
|---|---|---|---|---|
| 5,655,120 | A * | 8/1997 | Witte et al. | 718/105 |
| 5,838,968 | A * | 11/1998 | Culbert | 718/104 |
| 7,698,707 | B2 * | 4/2010 | Accapadi et al. | 718/102 |
| 8,789,052 | B2 * | 7/2014 | Small | 718/100 |

* cited by examiner

*Primary Examiner* — Eric C Wai
(74) *Attorney, Agent, or Firm* — Fish & Richardson P.C.

(57) ABSTRACT

Among other disclosed subject matter, a computer-implemented method includes receiving an indication that execution of an instance of a first task is degraded relative to a performance threshold associated with the first task. Performance data associated with the execution of the instance of the first task and performance data associated with execution of a plurality of additional tasks executed on the computing device are collected. For each of the plurality of additional tasks, the method includes determining a score for the respective additional task based on the performance data associated with the execution of the instance of the first task and performance data associated with the respective additional task. The method includes identifying one or more additional tasks as a potential cause of degraded performance based on the scores associated with each of the plurality of additional tasks. The method includes modifying an execution of a particular identified task.

24 Claims, 3 Drawing Sheets

FIG. 1

Ranking of Possible Performance Antagonists

| Task Name | Score |
|---|---|
| 1. OCR_Task 1 | 0.914 |
| 2. Dictionary_Task | 0.800 |
| 3. OCR_Feature_Extractor Task | 0.610 |
| 4. OCR_Task 2 | 0.604 |
| 5. Mail_Server | -0.538 |
| 6. Transcoder_Job | -0.988 |

FIG. 2

IDENTIFYING TASK INSTANCES THAT INTERFERE WITH PROCESSOR PERFORMANCE

BACKGROUND

This document relates to managing task performance.

Systems for large-scale parallel processing can include performing computer tasks and/or processes on a cluster of computers and/or servers (e.g., task parallelism). Each computer in the cluster can perform part of a particular task by executing one or more task instances. For example, different task instances of a particular task can be performed in parallel on various servers within a cluster of servers and can interact with the same or different data. A large number of tasks can be handled on the cluster of servers, and each task can be executed in multiple task instances. Generally, each task instance executes the same set of software instructions, although the various tasks are typically executed in support of various different processes.

As a computer in the cluster performs the tasks, the tasks can use common resources, such as the CPU, network bandwidth or memory. Because the tasks share these common resources, one task can interfere with the performance of other tasks executing on the same computer. For example, one task can require or use a greater share of the CPU and/or memory than other tasks and can cause the other tasks executed on the computer to have increased task latency or increase the number of CPU cycles needed to complete an instruction.

SUMMARY

This specification describes techniques for managing task performance, including identifying poorly performing tasks. In general, one innovative aspect of the subject matter described in this specification can be embodied in methods that include the actions of: receiving an indication that execution of an instance of a first task on a computing device is degraded relative to a performance threshold associated with the first task; collecting performance data associated with the execution of the instance of the first task and performance data associated with execution of a plurality of additional tasks executed on the computing device; for each of the plurality of additional tasks: determining a score for the respective additional task based on the performance data associated with the execution of the instance of the first task and performance data associated with the respective additional task; identifying one or more additional tasks as a potential cause of degraded performance for the instance of the first task based on the scores associated with each of the plurality of additional tasks; and modifying an execution of a particular identified task.

These and other embodiments can each optionally include one or more of the following features. The method can include modifying the execution of the particular identified task by modifying the execution of the particular identified task to determine whether the particular identified task is a cause of degraded performance for the instance of the first task, wherein the particular identified task is selected from the one or more additional tasks based on a score. The particular identified task can include a highest ranked task in a ranking of the one or more identified additional tasks, a highest ranked task other than a high priority task or a task with a score above a predetermined score. The performance data associated with the instance of the first task includes cycles per instruction data associated with the instance of the first task. The performance data associated with the plurality of additional tasks includes processor usage data associated with each of the plurality of additional tasks. The time period associated with the cycles per instruction data corresponds to a time period associated with the processor usage data. Each score can represent a correlation between the performance data associated with the instance of the first task and the performance data associated with the respective additional task. The method can include determining the score by normalizing the performance data associated with the instance of the first task before determining the score. The method can include determining whether the particular identified task is a high-priority task and modifying the execution of the particular identified task based on the determination that the particular identified task is a not a high-priority task. The method can include selecting a second particular identified task from the one or more additional tasks and modifying the execution of the second particular task based on the determination that the particular task is a high priority task.

Particular embodiments of the subject matter described in this specification can be implemented so as to realize one or more of the following advantages. Overall performance of a task or computer can be improved by identifying tasks that incur severe shared resource contention and cause another task to perform poorly (e.g., an interfering task). The execution of the interfering tasks can be modified (e.g., rescheduling to a different computer) to improve the performance of the poorly performing task. In addition, system administrators or operators can analyze performance data and other conditions associated with the interfering task to identify causes or to determine solutions to prevent the task from interfering with the CPU's performance. The identification of an interfering task and the modification of the interfering task's execution can be automated and incorporated into existing systems.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

In general, a computer can execute one or more tasks that share common resources (e.g., cache, memory, processor cycles, etc.). A task can be identified as a poorly performing task, and both performance data associated with the poorly performing task ("a protagonist task") and performance data associated with other tasks executed on the computer ("possible performance antagonists") can be collected. For example, the system can collect cycles per instruction data associated with the protagonist task and CPU usage data associated with the possible performance antagonists. A score can be generated for each of the possible performance antagonists. The scores can be based on the performance data associated with the protagonist task and the possible performance antagonists. The score can represent a probability that a particular performance antagonist is causing the protagonist task's degraded performance. The possible performance antagonists can be ranked based on the scores. The execution of the possible performance antagonists can be modified to determine whether a particular performance antagonist is the cause of the protagonist task's degraded performance ("the probable performance antagonist"). For example, the performance antagonist with the largest score can be throttled or rescheduled to a different machine. After the throttling or rescheduling the performance antagonist with the largest score, the protagonist task's performance data can be monitored to determine whether the protagonist task's performance improves. If the protagonist task's performance data improves and the amount of improvement is greater than a predetermined threshold, the particular suspected performance antagonist can be identified as the probable performance antagonist.

Figure 1:
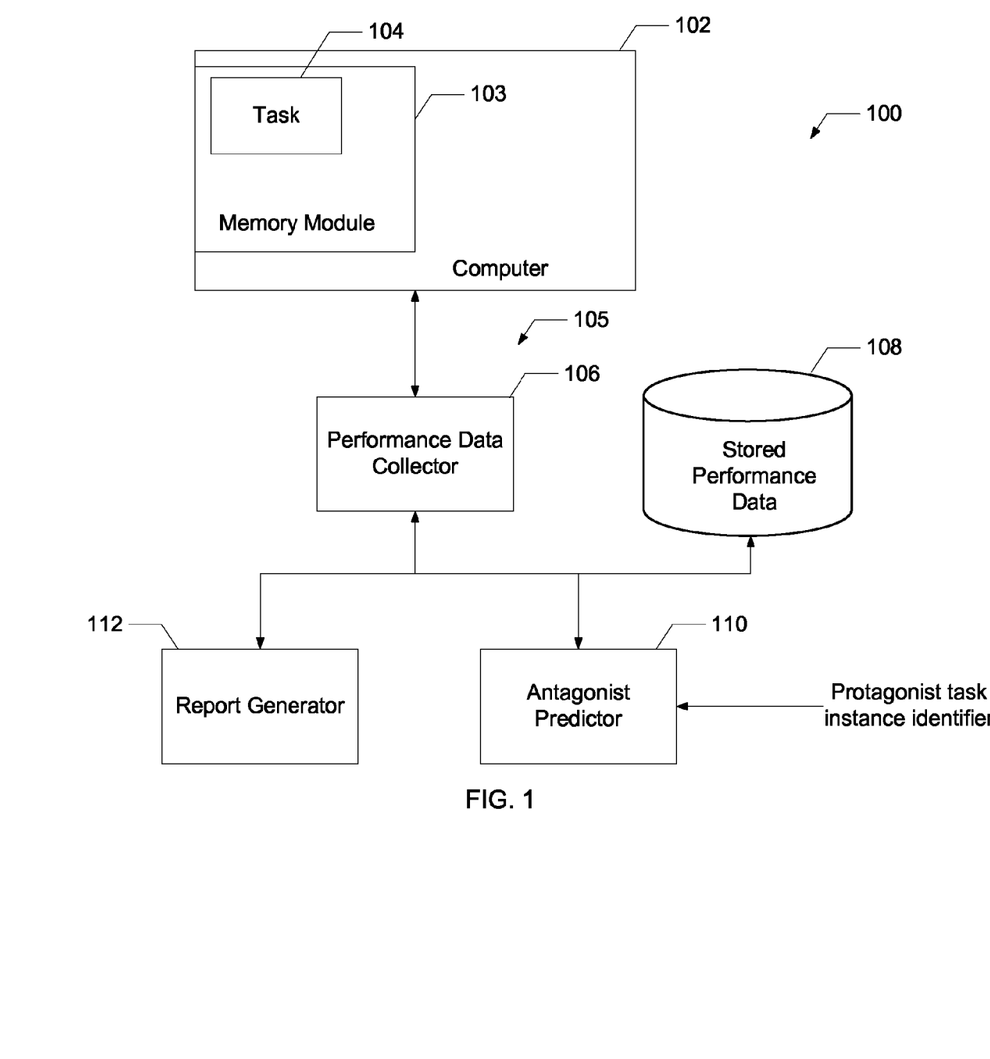
FIG. 1 is a block diagram of an example system for managing task performance.

FIG. 1 is a block diagram of an example system 100 for managing task performance. The example system 100 includes a computer 102, multiple tasks and/or task instances 104 stored in memory 103 and executed on the computer 102, and a performance management system 105 that includes a performance data collector 106, a database 108, a performance antagonist predictor 110, and a report generator 112. The computer 102 can be various types of data processing apparatus. For example, the computer 102 can be a server included in a group of servers (e.g., a server farm) or part of a cluster of computers. In some implementations, the computer 102 can be a laptop, a personal computer or a mobile device. Although FIG. 1 illustrates only one computer 102, additional computers can be included in the system 100.

The computer 102 can perform multiple tasks or task instances 104, which are stored in memory 103. A task can be a set of executable instructions that can be performed by the computer 102, and a task instance can be a particular copy of the task executed on a particular computer. A particular task can have multiple task instances executed on multiple computers or on a single computer.

The computer 102 can perform multiple tasks or task instances 104 in parallel. For example, the computer 102 can execute one or more instances of a dictionary lookup task, a data analysis task, and one or more graphics rendering tasks. Each of the tasks or task instances 104 can access or share the computer's resources. For example, the tasks and/or task instances 104 can share the computer's cache or CPU. For ease of discussion, the term "task" will be used to refer to either a task or task instance.

The computer 102 can include one or more performance counters to measure performance data associated with the computer 102 and the tasks 104 executed on the computer. For example, the computer 102 can include a CPU that includes a performance counter. In some implementations, a first performance counter can count the number of instructions performed and a second performance counter can count the CPU cycles used by the computer to execute a task. This information can be represented by cycles per instruction (CPI) data, where lower CPI values are interpreted to correspond with better performance. In addition, the performance counter can measure CPU usage associated with each task 104. For example, the performance counter can determine the relative amount of the CPU's resources that are used to perform a particular task. In some implementations, the performance counter data can reflect the memory usage associated with each task (e.g., the number of cache misses and the number of cache references, hereinafter referred to as "cache data") and the amount of time or number of cycles each task waits for a memory access. The performance counter can store or associate time stamp information with the performance data. For example, the performance counter can store a time stamp with each CPI data measurement and/or CPU usage measurement. In some implementations, the CPU usage and/or the performance counter data can be reported by an operating system associated with the computer 102.

Various sampling rates can be used by the performance counter. For example, the performance counter can sample CPI data or the CPU usage once every second or can be sampled once every five minutes. In some implementations, the performance counter samples the performance data every 100 milliseconds for five minutes and averages the collected performance data measurements over the five minute period. The performance counter can collect averaged performance data measurement over a period of time.

In some implementations, the performance counter measures the performance data after receiving an instruction from the performance management system 105. For example, the performance data collector 106 can provide an instruction to the performance counter in the computer 102 to begin collecting performance data (e.g., the CPI data and CPU usage data associated with one or more tasks executed on the computer 102). In some implementations, the performance data collector 106 can instruct the performance counter to collect data for a predetermined amount of time (e.g., 5 minutes, 10 minutes, 30 minutes, etc.). In some implementations, the performance counter can continuously measure the performance data and provide the performance data associated with each task to the performance management system 105. The performance data can be monitored or collected on-the-fly and can be provided to the performance data collector 106 via a network connection or other data connection. In some implementations, the performance counter collects performance data and periodically provides the collected performance data to the performance data collector 106. Alternatively, the performance counter can store performance data in a memory, and the performance data collector 106 can periodically retrieve the performance data from the memory.

The performance data collector 106 can store the performance data received from the computer 102 in the database 108. The database 108 can be any appropriate type of database or other memory that can be accessed by the performance data collector 106, the antagonist predictor 110 and/or the report generator 112.

In some implementations, the database 108 can organize the performance data based on the time stamp information associated with the performance data. For example, each task's performance data can be arranged in chronological order. The performance data collector 106 can also associate information to uniquely identify a task with the performance data associated with the task. For example, the database 108 can store the task name, an index number associated with the task and the user that initiated the task corresponding to the task and associate this information with the performance data.

The antagonist predictor 110 can receive an indicator or signal that identifies a poorly performing task (e.g., a protagonist task). For example, the antagonist predictor 110 can receive an indicator from the computer 102 or other system that identifies the protagonist task. An example system to identify a protagonist task is described in U.S. patent application Ser. No. 13/183,234, "IDENTIFYING TASK OUTLIERS BASED ON METRIC DATA IN A LARGE SCALE PARALLEL PROCESSING SYSTEM" and is incorporated by reference. In some implementations, the protagonist task is identified as poorly performing because the protagonist task's performance data is greater than a predetermined threshold (e.g., "CPIBad_Threshold"). The value of the predetermined threshold can be an expected CPI value. For example, the predetermined threshold can be based on the protagonist task's performance data associated with other computers. In some implementations, the value of the predetermined threshold can be based on previously observed performance data measurements associated with the protagonist task at a time when it was performing within acceptable levels. In some implementations, the predetermined threshold is provided to the antagonist predictor 110 as part of the indicator or signal. It is noted that a protagonist task can be either a task (i.e., all of the instances of a particular task collectively) or individual task instances.

After receiving an indication that identifies the protagonist task, the antagonist predictor 110 can use the stored performance data to generate scores for the other tasks executed on the computer (e.g., possible performance antagonists). For example, the antagonist predictor 110 can use the correlation between the protagonist task's CPI data and the CPU usage data associated with the possible performance antagonist that is causing the protagonist task's degraded performance (e.g., the probable performance antagonist) to generate a score for each of the possible performance antagonists. The score can be based on the performance data associated with the protagonist task and the performance data associated with the particular possible performance antagonist. In some implementations, the antagonist predictor 110 can generate scores using the following equation:

$$\text{Score}(A,B) = \Sigma (C_i - \text{CPIBad\_threshold}) * U_i \quad (1)$$

where A is the protagonist task, B is a possible performance antagonist, $C_i$ is the CPI data associated with A at time instance i, and $U_i$ is the CPU usage data associated with B at time instance i. The score is based on the n collected performance data measurements. In some implementations, the CPU usage data can be normalized such that the sum of the $U_i$ for the n data measurements equals 1 (i.e. $\Sigma U_i = 1$). The score can represent a probability or a prediction that a particular performance antagonist (e.g., the probable performance antagonist) is causing the protagonist task's degraded performance because the degraded performance can be correlated with abnormal CPU usage in a possible performance antagonist.

In some implementations, the antagonist predictor 110 is configured to normalize the scores. For example, the antagonist predictor 110 can normalize the generated scores to have values between -1 and 1. In some implementations, the antagonist predictor 110 can use the expected CPI value (e.g., CPIBad_Threshold) to normalize the scores. For example, the scores can be normalized as follows:

$$\text{If } C_i > \text{CPIBad\_Threshold, then } Cn_i = (1 - \text{CPIBad\_Threshold}/C_i) * U_i \quad (2)$$

$$\text{If } C_i < \text{CPIBad\_Threshold, then } Cn_i = (C_i/\text{CPIBad\_Threshold} - 1) * U_i \quad (3)$$

$$\text{Score}(A,B) = \Sigma Cn_i \quad (4)$$

The antagonist predictor 110 can rank the possible performance antagonists using the scores associated with the possible performance antagonists. For example, the antagonist predictor 110 can use the scores to rank the possible performance antagonists such that the possible performance antagonists that are most likely to be the probable performance antagonist are ranked higher than the possible performance antagonists that are less likely to be the probable performance antagonist.

Figure 2:
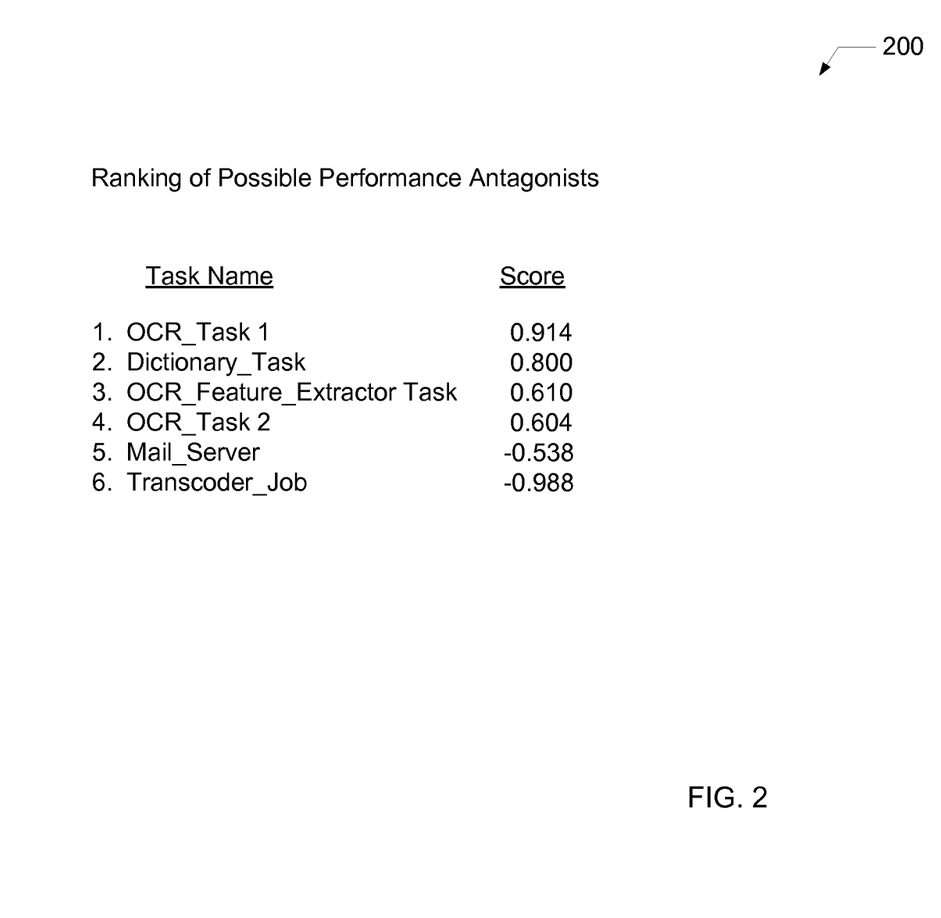
FIG. 2 is an illustration of an example ranking of possible performance antagonists.

FIG. 2 illustrates an example ranking 200 of possible performance antagonists. The ranking 200 lists the names of five possible performance antagonists and the scores associated with the five possible performance antagonists. As seen in ranking 200, the possible performance antagonists are ranked in descending order based on the scores. Other ranking schemes can be used.

The antagonist predictor 110 can use the ranking of possible performance antagonists to select a possible performance antagonist and modify the execution of the selected performance antagonist. For example, the antagonist predictor 110 can select the highest ranked possible antagonist predictor (e.g., OCR_Task) and limit the CPU usage or other resource usage associated with the selected performance antagonist (e.g., "throttling.") In some implementations, the antagonist predictor 110 can reschedule the possible antagonist such that it is executed on a different computer or can pause or halt the execution of the selected performance antagonist.

After the antagonist predictor 110 modifies the execution of the selected possible performance antagonist, the performance data collector 106 can instruct the performance counter associated with the computer 102 to collect additional performance data associated with the protagonist task for a predetermined amount of time and provide the collected performance data to the performance data collector 106. In some implementations, the predetermined amount of time is based on the sampling rate of the performance counter. For example, the predetermined amount of time can be equal to an amount of time sufficient to collect 5-10 performance data measurements.

The antagonist predictor 110 can then analyze the newly collected performance data to determine whether the selected performance antagonist is the probable performance antagonist. For example, the antagonist predictor can analyze the newly collected CPI data associated with the protagonist task and compare it to the CPIBad_Threshold to determine whether the protagonist task's performance has improved. If the collected CPI data is less than or equal to the CPIBad_Threshold, then the antagonist predictor 110 can determine that the selected performance antagonist is the probable performance antagonist. If the newly collected CPI data is greater than the CPIBad_Threshold, then the antagonist predictor 110 can restore the possible antagonist's execution (e.g., reverse the modification of possible antagonist's execution), select the next highest ranked performance antagonist and modify the execution of the newly selected performance antagonist to determine whether the newly selected performance antagonist is the probable antagonist.

In some implementations, the antagonist predictor 110 selects a possible performance antagonist for throttling based on the rank and a priority associated with the possible performance antagonist. For example, if OCR_Task 1 is a high priority task that should not be modified and Dictionary_Task is a low priority task, the antagonist predictor 110 can select Dictionary_Task and modify its execution. In some implementations, the antagonist predictor 110 can access a database that includes priority information associated with tasks and whether a task can be modified.

In some implementations, the antagonist predictor 110 can compare the selected performance antagonist's priority and the protagonist task's priority. If the selected performance antagonist's priority is greater than the protagonist task's priority, the analytic predictor 110 can record this in the database 108 and then select the next highest ranked performance antagonist that has a priority less than or equal to the protagonist task's priority for throttling. This information can be included in a report generated by the report generator 112.

In some implementations, the report generator 112 can be used to generate a report. For example, the report can include the ranked possible performance antagonists, the scores associated with the ranked performance antagonists, the performance data associated with the protagonist task and the possible performance antagonists. In some implementations, the report can include priority data associated with the possible performance antagonists.

Figure 3:
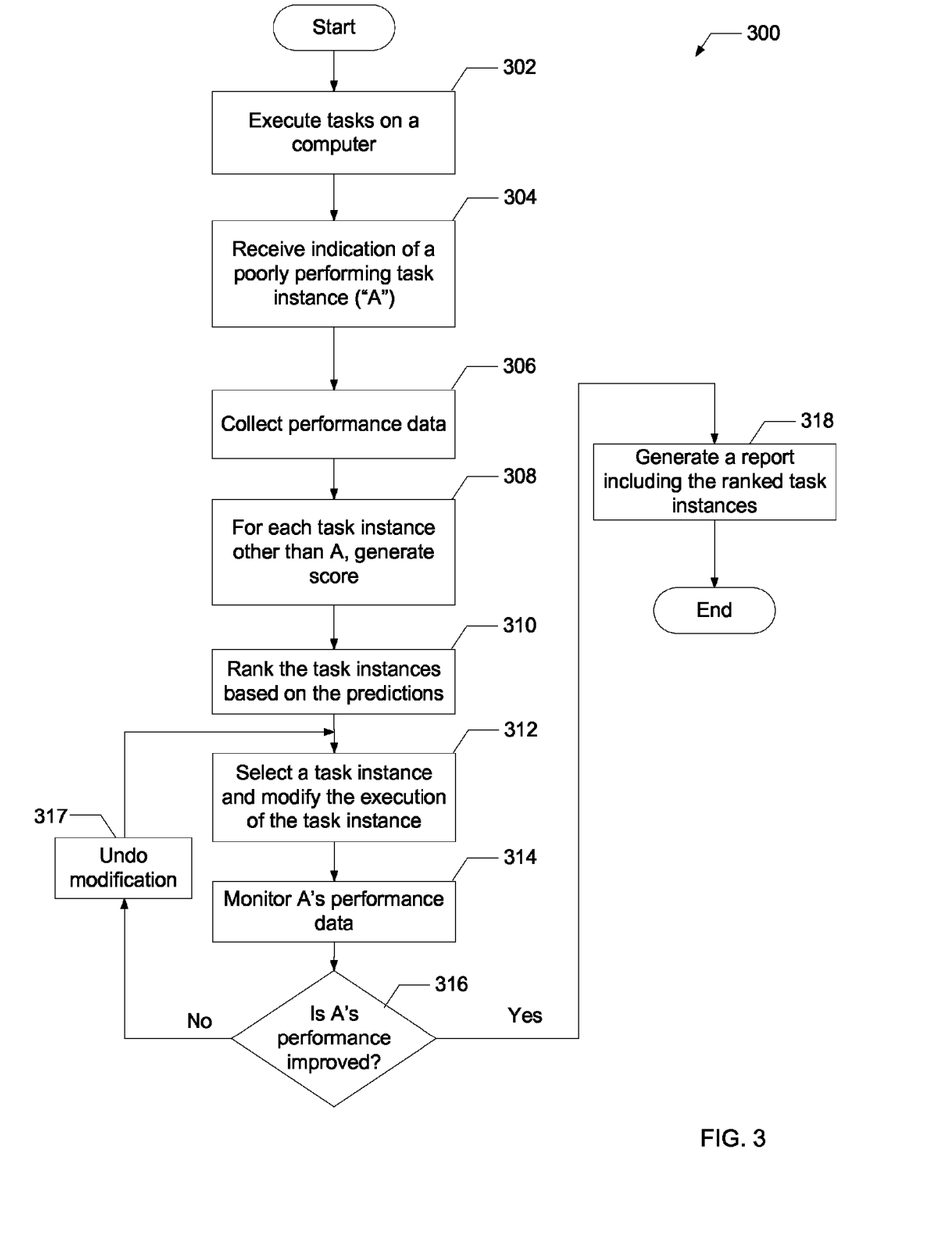
FIG. 3 is an illustration of an example process for managing task performance.

FIG. 3 is an illustration of an example process 300 for managing task performance. At 302, multiple tasks are executed on a computer. For example, computer 102 can execute an optical character recognition task, one or more graphics rendering tasks, data processing tasks and/or a dictionary lookup. As the tasks are executed, the tasks share and/or compete for the computer's resources (e.g., cache, CPU, memory, network bandwidth, etc.). In some implementations, the computer 102 can collect performance data associated with the multiple tasks executed on the computer. The performance data can be stored in the computer 102.

As the multiple tasks are executed on a computer, the performance management system can receive an indication or signal that identifies a poorly performing task (at 304). For example, the antagonist predictor 110 can receive the indication or signal from the computer 102, a different portion of the performance management system 105 or a system that identifies poorly performing tasks (protagonist tasks). The indication or signal can identify the protagonist task ("A") using the task name, an index number associated with the task and the user that initiated the task corresponding to the task. The indication or signal can also include expected performance data associated with the protagonist task. For example, the indication can include a threshold CPI value ("CPI-Bad_Threshold") that is associated with a task that is performing within acceptable levels. In some implementations, the CPIBad_Threshold can be based on the protagonist task's performance on other computing devices that are executing the same task.

At 306, the performance management system can collect performance data from the computer. For example, the performance data collector 106 can instruct the computer 102 to collect performance data associated with the tasks executed on the computer 102 and time stamp information associated with the performance data. In some implementations, the performance data includes CPI data and CPU usage data associated with the tasks executed on the computer 102. In some implementations, the performance data includes CPI data associated with the protagonist task and CPU usage data associated with the other tasks executed on the computer 102. Various amounts of data can be collected. For example, the performance data collector 106 can instruct the computer 102 to collect data during a time period of thirty minutes. The sampling rate of the performance counter can vary depending on the computer 102. In some implementations, the computer 102 collects performance data every 100 milliseconds and provides an averaged performance data measurement every five minutes during the time period for collecting performance data. The performance data is provided to the performance data collector 106. In some implementations, the performance data collector 106 can instruct computer 102 to provide stored performance data (e.g., performance data previously collected and used to identify the protagonist task).

The performance data can be stored in the database 108. The performance data collector 106 can organize the performance data based on the time stamp information associated with the performance data. For example, each task's performance data can be arranged in chronological order. Alternatively, the performance data can be arranged in order of increasing performance (e.g., performance data for time periods in which the task used a larger number of cycles per instruction can be ranked higher than for time periods in which the task used a smaller number of cycles per instruction). The performance data collector 106 can also associate information to uniquely identify a task with the performance data associated with the task. For example, the performance data collector 106 can store the task name, an index number associated with the task and the user that initiated the task corresponding to the task.

At 308, the performance management system can generate a score for each of the tasks executed on the computer other than the protagonist task (e.g., possible performance antagonists). For example, the antagonist predictor 110 can use the correlation between the protagonist task's CPI data and the CPU usage data associated with each of the possible performance antagonist to generate a score for each of the possible performance antagonists. The score can be based on the performance data associated with the protagonist task and the performance data associated with the particular possible performance antagonist. In some implementations, the antagonist predictor 110 can generate scores using the following equation:

$$\text{Score}(A,B) = \Sigma(C_i - \text{CPIBad\_threshold}) * U_i$$

where A is the protagonist task, B is a possible performance antagonist, $C_i$ is the CPI data associated with A at time instance i and $U_i$ is the CPU usage data associated with B at time instance i. The score is based on the n performance data measurements. In some implementations, the CPU usage data can be normalized such that the sum of the $U_i$ for the n performance data measurements equals 1 (i.e. $\Sigma U_i=1$). The CPU usage data can be normalized for different reasons. For example, the CPU usage data can be normalized to prevent any bias against tasks normally associated with large CPU usage $U_i$. The score can represent a probability that a particular performance antagonist (e.g., the probable performance antagonist) is causing the protagonist task's degraded performance.

In some implementations, the antagonist predictor 110 normalizes the scores. For example, the antagonist predictor 110 can use the expected CPI value (e.g., CPIBad_Threshold) to normalize the scores as follows:

If $C_i > \text{CPIBad\_Threshold}$, then $Cn_i = (1 - \text{CPIBad\_Threshold}/C_i) * U_i$ If $C_i < \text{CPIBad\_Threshold}$, then $Cn_i = (C_i/\text{CPIBad\_Threshold} - 1) * U_i$ $$\text{Score}(A,B) = Cn_i$$

After the scores are generated, the performance management system can rank the possible performance antagonists using the scores (at 310). For example, the antagonist predictor 110 can rank the possible performance antagonists such that a possible performance antagonist with the highest score is ranked first.

At 312, the performance management system can select a possible performance antagonist and modify the execution of the selected performance antagonist. For example, the antagonist predictor 110 can select the highest ranked possible performance antagonist (e.g., the possible performance antagonist having the highest score) and throttle the selected possible performance antagonist. In some implementations, the antagonist predictor 110 can reschedule the selected possible performance antagonist such that it is executed on a separate computer or halt the execution of the selected possible performance antagonist.

At 314, the performance management system monitors the protagonist task's performance data. For example, the performance data collector 106 can instruct the computer 102 to collect performance data associated with the protagonist task. In some implementations, the computer 102 monitors the performance data for a predetermined amount of time. For example, the computer 102 can monitor the protagonist task's performance data for a time sufficient to capture five to ten performance data measurements. The actual amount of time can vary depending on sampling rate associated with the performance counter.

At 316, the performance management system analyzes the protagonist task's performance data to determine whether the protagonist task's performance has improved. For example, the antagonist predictor 110 can average the newly collected performance data (e.g., CPI data) and compare the averaged CPI data to the CPIBad_Threshold to determine whether the protagonist task's performance has improved. If the averaged CPI data is greater than the CPIBad_Threshold, the antagonist predictor 110 can de-throttle the selected performance antagonist (at 317) and select the next highest ranked performance antagonist (at 312). If the averaged CPI data is less than or equal to the CPIBad_Threshold, the antagonist predictor 110 can determine that the selected performance antagonist is the probable performance antagonist. In some implementations, the antagonist predictor 110 can repeat 312-316 for each of the possible performance antagonists and identify multiple probable performance antagonists.

In some implementations, the antagonist predictor 110 can determine the difference between the average CPI data and the average of the CPI data collected at 306 and compare the difference to a predetermined threshold ("improvement threshold"). If the difference is greater than or equal to the improvement threshold, the antagonist predictor 110 can determine that the selected performance antagonist is the probable performance antagonist. If the difference is less than the improvement threshold, the antagonist predictor 110 can de-throttle the selected performance antagonist and select a different performance antagonist to be modified.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, performance management system can filter the performance data received from the cluster by removing potentially unreliable performance data (e.g., data representing low CPU usage or performance data that is extremely high or low). For example the performance management system can compare the performance data to predetermined parameters (e.g., CPU usage thresholds) that indicate the performance data is potentially unreliable. As another example, the threshold value can be based on a weighted average or a piecewise linear function. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A computer-implemented method comprising:
receiving an indication that execution of an instance of a first task on a computing device is degraded relative to a performance threshold associated with the first task;
collecting performance data associated with the execution of the instance of the first task and performance data associated with execution of a plurality of additional tasks executed on the computing device;
for respective tasks from the plurality of additional tasks:
determining a score for the respective additional task based on a correlation between the performance data associated with the execution of the instance of the first task and performance data associated with the execution of the respective additional task, the score representing a probability that the respective additional task is a cause of degraded performance of the instance of the first task;
identifying one or more additional tasks as a potential cause of degraded performance for the instance of the first task based on the scores each of which are associated with the first task and one of the plurality of additional tasks;
selecting a particular identified task from the one or more identified additional tasks using a corresponding score for the particular identified task and the instance of the first task;
modifying an execution of the particular identified task; and
determining whether the particular identified task is a cause of degraded performance for the instance of the first task.

2. The computer-implemented method of claim 1 comprising:

ranking the one or more identified additional tasks using the scores, wherein selecting the particular identified task from the one or more identified additional tasks comprises selecting a highest ranked task in the ranking of the one or more identified additional tasks that is notes a high priority task.

3. The method of claim 1 wherein the performance data associated with the instance of the first task includes cycles per instruction data associated with the instance of the first task.

4. The method of claim 3 wherein the performance data associated with the plurality of additional tasks includes processor usage data associated with each of the plurality of additional tasks.

5. The method of claim 4 wherein a time period associated with the cycles per instruction data corresponds to a time period associated with the processor usage data.

6. The method of claim 1 wherein determining the score includes normalizing the performance data associated with the instance of the first task before determining the score.

7. The method of claim 6, wherein normalizing the performance data associated with the instance of the first task before determining the score comprises normalizing a sum of a particular performance measure for each of the plurality of additional tasks.

8. The method of claim 1 wherein modifying the execution of the particular identified task includes relocating the task to a second computer.

9. The method of claim 1 wherein modifying the execution of the particular identified task includes limiting resources associated with the computing device used to execute the particular identified task.

10. The method of claim 1 further comprising:
determining whether the particular identified task is a high-priority task; and
modifying the execution of the particular identified task based on the determination that the particular identified task is a not a high-priority task.

11. The method of claim 10 further comprising:
selecting a second particular identified task from the one or more additional tasks; and
modifying the execution of the second particular task based on the determination that the particular task is a high priority task.

12. The method of claim 1 wherein the correlation between the performance data associated with the instance of the first task and the performance data associated with the respective additional task comprises a correlation between a first performance measure of the first task and a second performance measure of the respective additional task.

13. The method of claim 12, wherein:
the first performance measure of the first task comprises a performance measure of a first property of the instance of the first task; and
the second performance measure of the respective additional task comprises a performance measure of a second property of the respective additional task, the second property different than the first property.

14. The method of claim 13, wherein the first property comprises cycles per instruction and the second property comprises computer processor unit usage.

15. A system comprising:
memory;
one or more processors coupled to the memory and configured to execute instructions causing the one or more processors to perform operations comprising:
receiving an indication that execution of an instance of a first task on a computing device is degraded relative to a performance threshold associated with the first task;
collecting performance data associated with the execution of the instance of the first task and performance data associated with execution of a plurality of additional tasks executed on the computing device;
for respective tasks from the plurality of additional tasks:
determining a score for the respective additional task based on a correlation between the performance data associated with the execution of the instance of the first task and performance data associated with the execution of the respective additional task, the score representing a probability that the respective additional task is a cause of degraded performance of the instance of the first task;
identifying one or more additional tasks as a potential cause of degraded performance for the instance of the first task based on the scores each of which are associated with the first task and one of the plurality of additional tasks;
selecting a particular identified task from the one or more identified additional tasks using a corresponding score for the particular identified task and the instance of the first task;
modifying an execution of the particular identified task; and
determining whether the particular identified task is a cause of degraded performance for the instance of the first task.

16. The system of claim 15 the operations comprising:
ranking the one or more identified additional tasks using the scores, wherein selecting the particular identified task from the one or more identified additional tasks comprises selecting a highest ranked task in the ranking of the one or more identified additional tasks that is not a high priority task.

17. The system of claim 15 wherein the performance data associated with the instance of the first task includes cycles per instruction data associated with the instance of the first task.

18. The system of claim 17 wherein the performance data associated with the plurality of additional tasks includes processor usage data associated with each of the plurality of additional tasks.

19. The system of claim 18 wherein a time period associated with the cycles per instruction data corresponds to a time period associated with the processor usage data.

20. The system of claim 15 wherein determining the score includes normalizing the performance data associated with the instance of the first task before determining the score.

21. The system of claim 15 wherein modifying the execution of the particular identified task includes relocating the task to a second computer.

22. The system of claim 15 wherein modifying the execution of the particular identified task includes limiting resources associated with the computing device used to execute the particular identified task.

23. The system of claim 15, wherein the operations further comprise:
determining whether the particular identified task is a high-priority task; and
modifying the execution of the particular identified task based on the determination that the particular identified task is a not a high-priority task.

24. The system of claim 23 wherein the operations further comprise:
    selecting a second particular identified task from the one or more additional tasks; and
    modifying the execution of the second particular task based on the determination that the particular task is a high priority task.

\* \* \* \* \*